(12) United States Patent
Edwards et al.

(10) Patent No.: US 6,404,942 B1
(45) Date of Patent: Jun. 11, 2002

(54) FLUID-ENCAPSULATED MEMS OPTICAL SWITCH

(75) Inventors: Victoria Ann Edwards, Horseheads; Bernard Eid; Christopher Philip Brophy, both of Corning; Darol Chamberlain, Ithaca, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/421,765

(22) Filed: Oct. 19, 1999

Related U.S. Application Data
(60) Provisional application No. 60/105,323, filed on Oct. 23, 1998.

(51) Int. Cl.[7] .................................................. G02B 6/35
(52) U.S. Cl. .......................................... 385/18; 385/17
(58) Field of Search .......................... 385/16–18, 20–22

(56) References Cited

U.S. PATENT DOCUMENTS

| | | | |
|---|---|---|---|
| 4,580,873 A | 4/1986 | Levinson | 385/17 |
| 4,725,127 A | 2/1988 | Malinge et al. | |
| 4,932,745 A | 6/1990 | Blonder | |

(List continued on next page.)

FOREIGN PATENT DOCUMENTS

| | | |
|---|---|---|
| EP | 0 902 538 A2 | 1/1998 |
| EP | 0 880 040 A2 | 5/1998 |
| JP | 55-111905 | 8/1980 |
| JP | 57-94702 | 6/1982 |
| JP | 57-192902 | 11/1982 |
| JP | 62-138820 | 6/1987 |
| JP | 1-200317 | 8/1989 |

OTHER PUBLICATIONS

Juan et al. "High–Aspect–Ratio Si Vertical Micromirror Arrays for Optical Switching" Journal o fMicroelectromechanical Systems, vol. 7, No. 2, Jun. 1998.*

Lee et al. "Surface–Micromachined Free–Space Fiber Optic Switches With Integrated Microactuators and Optical Fiber Communication Systems" 1997 International Conference on Solid–State Sensors for Actuators, Chicago, Jun. 16–19, 1997.*

Bart, Stephen F., et al.; Overcoming stiction in MEMS manufacturing; MICRO, Mar. 1995; pp. 49, 50, 52, 54, 56, 58.

Petersen, Kurt E.; Dynamic Micromechanics on Silicon: Techniques and Devices; IEEE Transactions on Electron Devices, vol. ED–25, No. 10, Oct. 1978; pp. 1241–1250.

Marxer, Cornel, et al; Vertical Mirrors Fabricated by Deep Reactive Ion Etching for Fiber–Optic Switching Applications; Journal of Microelectromechanical Systems, vol. 6, No. 3, Sep. 1997; pp. 277–285.

(List continued on next page.)

Primary Examiner—Brian Healy
Assistant Examiner—Sarah U Song
(74) Attorney, Agent, or Firm—Joanne N. Pappas

(57) ABSTRACT

A fluid encapsulated MEMS optical switch includes an optical waveguide matrix with MEMS mirrors situated in trenches located at waveguide cross-points. The trenches are filled with collimation-maintaining fluid and the mirrors are immersed therein. The collimation maintaining fluid prevents the light beam from spreading when it enters the switch cross-points. This feature enables the use of much smaller MEMS mirrors and prevents some of the typical MEMS mirror problems found in the related art. In particular, the MEMS mirror disclosed in the present invention is reduced to approximately 15 $\mu$m wide and 2 $\mu$m thick, resulting in shorter actuation distances of approximately 15 $\mu$m. This feature results in an optical switch having faster switching times.

6 Claims, 14 Drawing Sheets

U.S. PATENT DOCUMENTS

| | | | |
|---|---|---|---|
| 5,039,193 A | * 8/1991 | Snow et al. | 385/25 |
| 5,119,448 A | 6/1992 | Schaefer et al. | |
| 5,148,506 A | 9/1992 | McDonald | |
| 5,208,880 A | 5/1993 | Riza et al. | |
| 5,226,099 A | 7/1993 | Mignardi et al. | |
| 5,255,332 A | * 10/1993 | Welch et al. | 385/17 |
| 5,364,742 A | 11/1994 | Fan et al. | |
| 5,367,584 A | 11/1994 | Ghezzo et al. | |
| 5,619,177 A | 4/1997 | Johnson et al. | |
| 5,699,462 A | 12/1997 | Fouquet et al. | |
| 5,760,947 A | 6/1998 | Kim et al. | |
| 5,781,331 A | 7/1998 | Carr et al. | |
| 5,886,811 A | 3/1999 | Min | |
| 5,960,131 A | * 9/1999 | Fouquet et al. | 385/17 |
| 5,960,132 A | * 9/1999 | Lin | 385/18 |
| 5,995,688 A | * 11/1999 | Aksyuk et al. | 385/14 |
| 6,195,478 B1 | * 2/2001 | Fouquet | 385/17 |

OTHER PUBLICATIONS

Dautartas, Mino F., et al.; A Silicon–Based Moving–Mirror Optical Switch; Journal of Lightwave Technology, vol. 10, No. 8, Aug. 1992; pp. 1078–1085.

McCormick, F.B., et al.; Optical circuitry for free–space interconnections; Applied Optics, vol. 29, No. 14, May 10, 1990; pp. 2013–2018.

Pister, K.S.J., et al.; Microfabricated hinges; Sensors and Actuators, A. 33, 1992; pp. 249–256.

Toshiyoshi, Hiroshi, et al.; Electrostatic Micro Torsion Mirros for an Optical Switch Matrix; Journal of Microelectromechanical Systems, vol. 5, No. 4, Dec. 1996; pp. 231–237.

Wu, Ming C., et al.; Optical MEMS: Huge Possibilities for Lilliputian–Sized Devices; Optics and Photonics News, Jun. 1998; pp. 25–29.

Lee, Shi–Sheng, et al.; Free–Space Fiber–Optic Switches Based on MEMS Vertical Torsion Mirrors; Journal of Lightwave Technology, vol. 17, No. 1, Jan. 1999; pp. 7–13.

* cited by examiner

FLUID-ENCAPSULATED MEMS OPTICAL SWITCH

CROSS-REFERENCE TO RELATED APPLICATIONS

This application claims benefit of priority under 35 U.S.C. §119(e) for U.S. Provisional Patent Application Ser. No. 60/105,323 filed on Oct. 23, 1998, the content of which is relied upon and incorporated herein by reference in its entirety.

FIELD OF THE INVENTION

This invention relates generally to optical switches. In particular, the invention relates to an optical switching array that uses a movable MEMS mirror immersed in an index-matching collimation-maintaining fluid for both an open position and closed position of the switch.

BACKGROUND OF THE INVENTION

The approaches suggested for optical switches can be broadly classified into two categories: the guided wave approach, and the free-space approach. The guided-wave approach includes multiclad waveguides with bending modulation and specialty-material-based switching, whereas the free-space approach generally relies on movable optical elements such as mirrors or lenses.

Mach-Zehnder Interferometer devices, Y-branch waveguides, and other devices are commonly used in the guided-wave approach. Light is diverted from one arm of the device into the other by changing the refractive index of one of the arms of the device. This is typically done using electrical, thermal, or some other actuating mechanism.

The free-space approach has an advantage over the guided-wave approach in some applications. It has very low cross talk because the waveguides are physically isolated from one another and coupling cannot occur. The only source of cross talk in this approach is due to scattering off the movable optical element. In addition, free-space devices are wavelength-independent and often temperature-independent.

There have been several free-space approaches that have been proposed. One such approach uses a switch array with movable micro-electro-mechanical system (MEMS) mirrors. The input and output optical fibers are set in grooves and are disposed orthogonal to each other. The MEMS mirrors are positioned at the intersection of the input fibers and the output fibers, in free space. This method requires fairly large mirrors and collimators. This is due to the inevitable spreading of the light beam as it leaves the waveguide and travels in free-space toward the MEMS mirror. The large mirrors are problematic because of their requirements for angular placement accuracy, flatness, and the difficulty of actuating such a relatively large structure quickly and accurately. These devices typically have an actuation distance of 300 $\mu$m to 400 $\mu$m, which negatively impacts switching speed. In addition, the individual collimators must be assembled for each input and output fiber, thus increasing fabrication costs.

In a second free-space approach, a planar waveguide array is used. Trenches are formed at the cross-points of the input waveguides and the output waveguides. Digital micromirror devices (DMD) are positioned within the trenches, in free-space. Each micromirror acts like a shutter and is rotated into the closed position by an electrostatic or a magnetic actuator so that the light signal is reflected from an input waveguide into an output waveguide. When the shutter is in the open position, the light continues to propagate in the original direction without being switched. This method is also subject to the beam-spreading problem, and it appears that the typical losses from such a switch would be high.

A third free-space approach uses an index-matching fluid as the switching element. A planar waveguide array is formed on a substrate. Trenches are formed at the cross-points and are filled with a fluid that matches the refractive index of the waveguide core. In order to actuate the switch, the fluid is either physically moved in and out of the cross-point using an actuator, or the fluid is thermally or electrolytically converted into a gas to create a bubble. For this approach to work, the facets cut at the end of the waveguide at the cross-points must be of mirror quality, since they are used to reflect the light into the desired waveguide. Finally, the fluid must be withdrawn cleanly to preserve the desired facet geometry and to prevent scattering losses due to any remaining droplets.

In yet another approach, a beam is disposed diagonally over a gap in a waveguide. A mirror is suspended from the beam into the gap. An electrode is disposed adjacent to the gap and underneath the beam. When the electrode is addressed, the beam and mirror move into the gap to reflect light propagating in the waveguide. This approach has several disadvantages. This method is also subject to the beam-spreading problem discussed above. Again, it appears that the typical losses from such a switch would be high. Second, the electrodes are disposed on the substrate that the waveguides are disposed in. This design is costly to reproduce.

Thus, a need exists for an optical switch having the advantages of the free-space approach, without the disadvantages of the related designs discussed above.

SUMMARY OF THE INVENTION

The present invention addresses the needs discussed above. A movable MEMS mirror is disposed in a trench that is filled with a non-conducting, low-viscosity, index-matching fluid. The index-matching fluid functions as a collimation-maintaining fluid that prevents the light beam from spreading in switch cross-points. Thus, smaller mirrors are used at switch cross-points resulting in smaller actuation distances, and shorter actuation times.

One aspect of the present invention is an optical switch for directing a light signal. The optical switch includes at least one optical waveguide having an input port, an output port, and a core portion having a refractive index $n_1$. The switch also includes at least one trench formed in the at least one optical waveguide at a cross-point between the input port and the output port. A collimation-maintaining fluid is disposed in the at least one trench, wherein the collimation-maintaining fluid has a refractive index substantially the same as the refractive index of the core portion. The switch also includes at least one movable switching element having an open position and a closed position for directing the light signal into the output port. The at least one movable switching element is disposed in the at least one trench and substantially immersed in the collimation-maintaining fluid when in the open position and in the closed position.

In another aspect, the present invention includes a method for making an optical switch for transmitting a light signal. The method includes the steps of: forming a substrate, forming an optical waveguide layer having a predetermined index of refraction on the substrate, and forming a plurality of waveguide structures in the optical waveguide layer. A plurality of trenches are formed in the plurality of waveguide structures. A plurality of movable mirrors and actuators are formed on the substrate. A plurality of movable mirrors and actuators are disposed in the plurality of trenches. The plurality of trenches are filled with a collimation-maintaining fluid having an index of refraction that is substantially the same as the index of refraction of the optical waveguide layer, wherein the collimation-maintaining fluid substantially immerses each of the plurality of movable mirrors and actuators; and, sealing the optical switch.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

Figure 1:
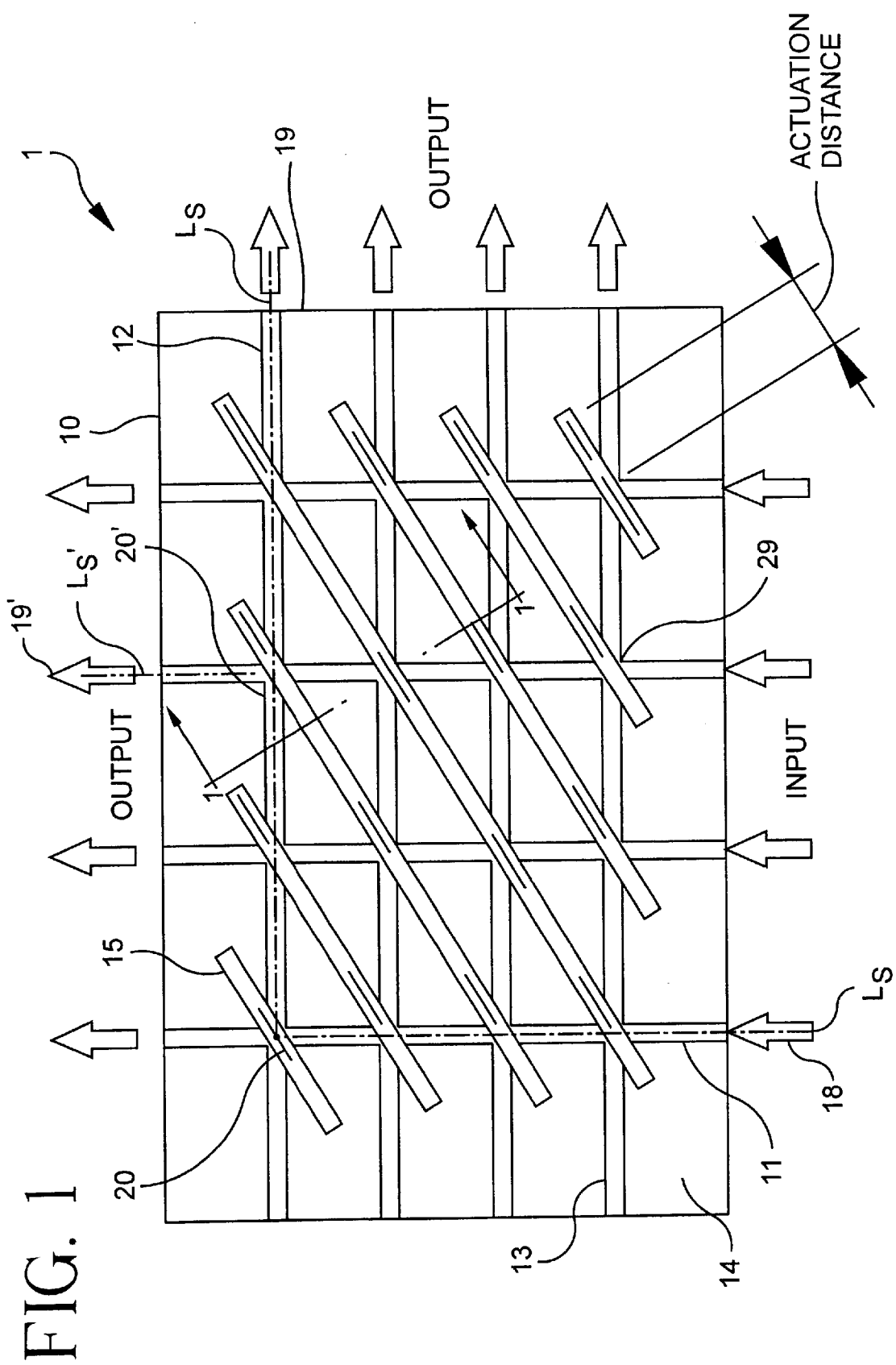
FIG. 1 is plan view of a first embodiment of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical switch of the present invention is shown in FIG. 1, and is designated generally throughout by reference numeral 1.

In accordance with the invention, the present invention for an optical switch includes a movable MEMS mirror 22 disposed in a trench 15 that is filled with a non-conducting, low-viscosity, index-matching fluid 30. The index-matching fluid 30 functions as a collimation-maintaining fluid that prevents the light beam from spreading in switch cross-points 29. Because the light signal remains collimated in the switch cross-points, smaller mirrors are used, resulting in smaller actuation distances, and hence, shorter actuation times. The preferred embodiment of the present invention is hereinafter described in greater detail with reference to the accompanying drawings.

FIG. 1 is a plan view of an optical switch 1 of the first embodiment of the present invention. The switch 1 is a waveguide matrix formed from a waveguide core material 13 and clad material 14, which are deposited on first substrate 10. The core 13 and the cladding 14 are arranged on first substrate 10, to form a plurality of input waveguides 11 and a plurality of output waveguides 12. A plurality of trenches 15 are formed at cross-points 29 wherein input waveguides 11 intersect output waveguides 12. One of ordinary skill in the art will recognize that there are several ways to form the trenches 15. First, the trenches 15 can be formed as shown in FIG. 1, as continuous diagonal channels that intersect a plurality of cross-points. Alternatively, the trenches 15 can be disposed as discrete wells, formed separately and intersecting a single cross-point.

A plurality of independently movable switching elements 20 are disposed in trenches 15 at each cross-point 29. Each switching element 20 can be independently moved between an open position and a closed position. In the open position, light is allowed to propagate through the switch cross-points 29. In the closed position, switching element 20 is moved into the cross-point 29 to direct light into the output waveguide 12.

The operation of switch 1 is as follows. A light signal $L_s$ enters switch 1 by way of input port 18. The light signal $L_s$ propagates within input waveguide 11 until it is deflected into the output waveguide 12 by the switching element 20, which is in the closed position. Light signal $L_s$ exits switch 1 from output port 19. Note also that two-sided switches can be used route light along multiple paths. Switch 20' is shown directing light signal $L_s'$ to output port 19'. Thus, the present invention can be configured as an N×M non-blocking crossbar switch.

Figure 2:
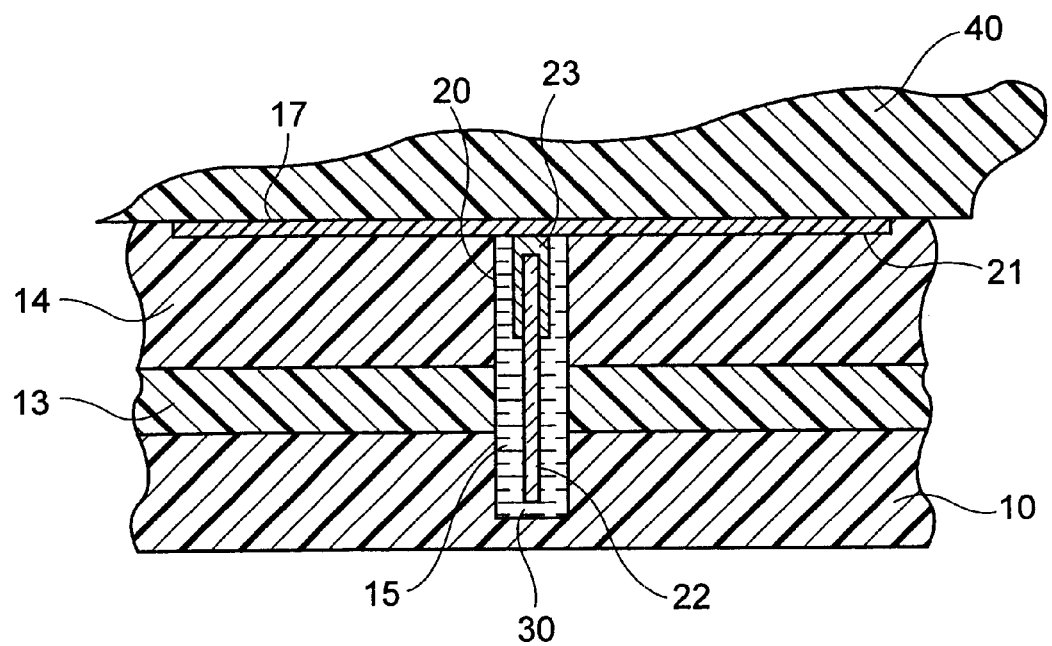
FIG. 2 is a sectional view of the first embodiment taken along lines 1—1 of FIG. 1, showing the relationship between the elements formed on the first substrate and the elements formed on the second substrate.

FIG. 2 is a sectional view of the optical switch 1 taken along lines 1—1 as depicted in FIG. 1. In the first embodiment, switching elements 20 are formed on a second substrate 40. The second substrate 40 is then aligned with the first substrate 10 such that the switching elements 20 are disposed in the plurality of trenches 15. The first substrate 10 is connected to the second substrate 40 by flip-chip bonding or similar methods at connection interface 17. In a third embodiment, which will be discussed subsequently, switching elements 20 can be formed on the first substrate 10. In this embodiment, the second substrate 40 functions merely as a cover for the switch 1.

Switching element 20 includes a sliding MEMS mirror 22, mirror anchor 23, MEMS chip 21, and an actuator 25, which is not shown in this view. The sliding mirror 22 is connected to MEMS chip 21 by mirror anchor 23, disposed in trench 15, and immersed in collimation maintenance fluid 30. The collimation maintenance fluid 30, is preferably a non-conducting, low viscosity fluid that has a refractive index that is closely or substantially matched to the refractive index of the core material 13. Electrically non-conducting fluid is required for all electrostatic actuators, but is not required for magnetic actuators. When using thermal actuators to implement the design, the fluid should not be of low thermal conductivity.

Mirror 22 is immersed in fluid 30 for both the open and closed switching positions. This yields distinct advantages over the related art. Typically, a light signal propagating in core 13 is collimated. When it enters the trench 15, the fluid 30 maintains collimation because it is matched to the refractive index of the core. Because beam spreading is mitigated by the fluid 30, a smaller mirror structure can be used. In the present invention, MEMS mirror 22 is only 15 $\mu$m wide and 2 $\mu$m thick.

The trench 15 is only 6 $\mu$m to 10 $\mu$m wide. As a result, a much shorter actuation distance, on the order of 15 $\mu$m, is achieved. This is a significant improvement over the related art that has actuation distances of 300 $\mu$m to 400 $\mu$m. This improvement also results in an optical switch 1 having a much shorter switching time of approximately 370 $\mu$sec, as compared to 10 msec for a 400 $\mu$m mirror. Note that trench 15 must be etched to a sufficient depth to allow mirror 22 to eclipse substantially all (>99%) of the modal energy of the light signal when in the reflecting position. In one embodiment, the trench is 6 $\mu$m wide, providing 2 $\mu$m clearance on either side of the 2 $\mu$m mirror 22. Those of ordinary skill in the art will appreciate that other structures, such as gratings and refracting elements, can be used to implement switching element 20.

In an alternate embodiment of the present invention, waveguides 11 and 12 have a $\Delta_{1-2}$~0.5%. One of ordinary skill in the art will recognize that $\Delta_{1-2}$ is defined as:

$$\Delta_{1-2} = \frac{n_1^2 - n_2^2}{2n_1^2},$$

wherein $n_1$ is the refractive index of the core and $n_2$ is the refractive index of the cladding. By raising $\Delta_{1-2}$ from 0.34% (matched to the fiber industry standard SMF-28) to 0.5%, a savings of 5–7 $\mu$m in actuation distance and 5 $\mu$m in trench depth is obtained.

Figure 3:
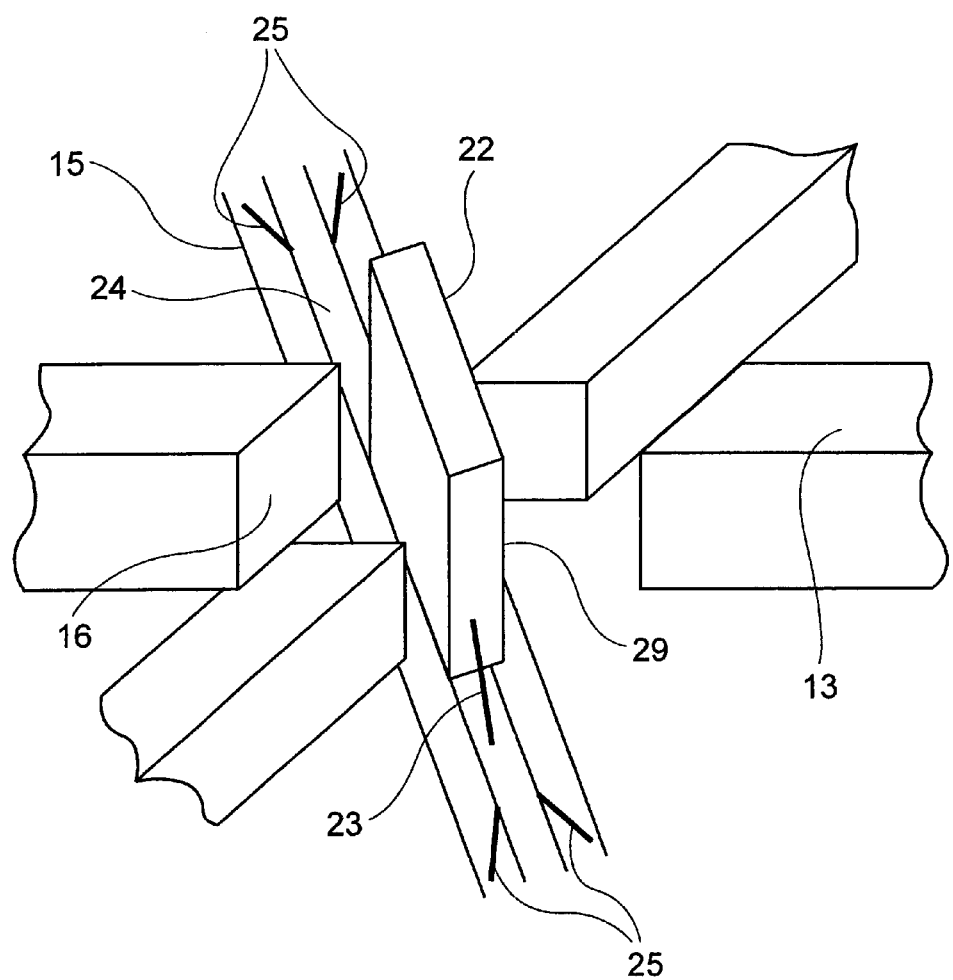
FIG. 3 is a three dimensional view of a second embodiment showing the sliding MEMS mirror assembly and the MEMS actuator.

FIG. 3 is a three dimensional view of the second embodiment. Slider 24 is disposed on the floor of trench 15. Sliding MEMS mirror 22 is connected to the slider 24 by the mirror anchor 23, shown schematically. MEMS mirror 22 is moved between an open position and a closed position by MEMS actuator 25, which moves the slider 24 in and out of the cross-point 29 depending on the desired switch position. The MEMS actuator 25 can be implemented in several ways that are widely known in the art. MEMS actuator 25 can be implemented using an electrostatic actuator, such as a scratch drive or a comb drive. A magnetic actuator can also be used in the design. A thermal actuator is a third method that can be used to implement actuator 25. Note that in FIG. 3 the collimation maintenance fluid 30 is not shown for clarity of illustration. However, the fluid 30 plays an important role in the machining requirements of waveguide facets 16. These requirements can be relaxed for two reasons: first, because collimation-maintenance fluid 30 inhibits beam spreading; and second, because the facets 16 are not used to reflect the light signal during switching. In FIG. 3, the facets 16 form an angle of approximately 45° with the face of the sliding MEMS mirror 22. However, because of the relaxed requirements, the angle need not be 45°. The angle could in fact be any arbitrary value between 0° and 45°.

Figure 4:
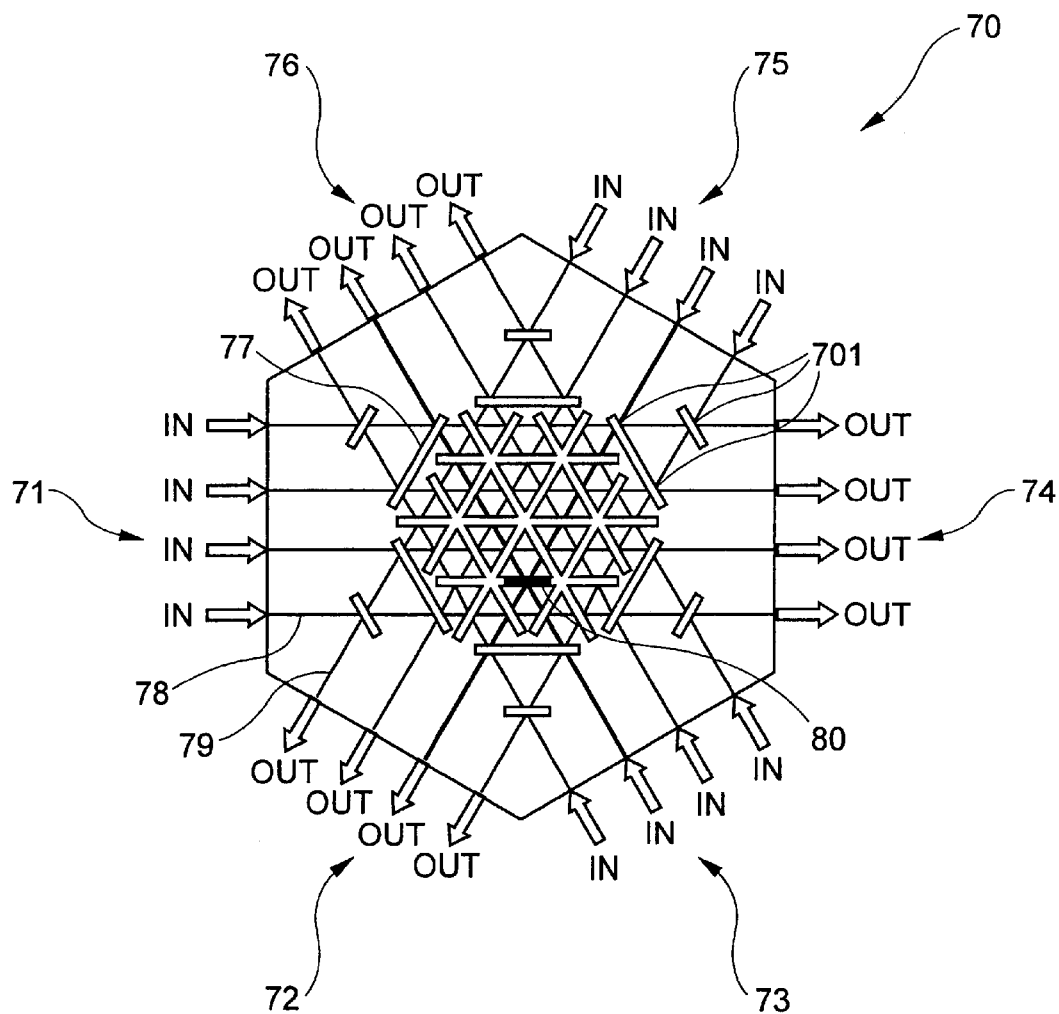
FIG. 4 is a plan view of a third embodiment of the present embodiment, showing a hexagonal version of the optical switch.

FIG. 4 is a plan view of a third embodiment of the present embodiment, depicting a hexagonal version of the optical switch 70. There are three linear arrays of input waveguides 71, 73, and 75 arranged on a first, third, and fifth side of hexagonal switch 70. There are three linear arrays of output waveguides 72, 74, and 76 arranged on a second, fourth, and sixth side of hexagonal switch 70. A two dimensional array of trenches 77 are disposed at cross-points 701 where the input optical waveguides 71, 73, and 75 intersect the output optical waveguides 72, 74, and 76. A plurality of independently movable switching elements, only one of which is shown for clarity of illustration, are disposed in trenches 77 at each cross-point 701. The switching elements of the second embodiment operate in the same manner as switching elements 20 of the first embodiment. Those skilled in the art will appreciate that other polygon array geometries could be used.

Figure 5A:
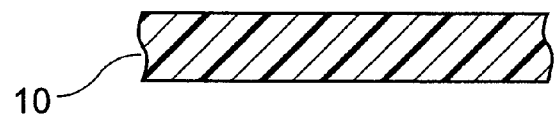
FIGS. 5A to 5H are a diagrammatic view of the first embodiment of the present invention showing the optical switch at various stages of fabrication.

FIGS. 5A to 5G are diagrammatic views of the first embodiment of the present invention showing the optical switch at various stages of fabrication. FIG. 5A shows the formation of a first substrate 10. First substrate 10 can be formed using any of the methods and materials commonly known to those of ordinary skill in the art. Such methods may include glass-forming methods, use of semiconductor materials such as silicon, chemical vapor deposition of silica, fused silica, ceramic materials, metallic materials, or polymeric materials.

Figure 5B:
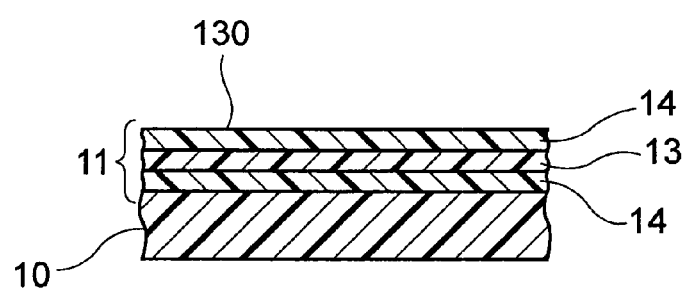

In FIG. 5B, an optical waveguide layer 11 is formed on substrate 10. A variety of methods and materials can be used to form Layer 11, including: sol-gel deposition of silica; amorphous silicon; compound semiconductor materials such as III-V or II-VI materials; doped chemical vapor deposition of silica; organic-inorganic hybrid materials; or polymer materials. Layer 11 includes waveguide core material 13 and waveguide clad material 14. The waveguide structures 130 are then formed using photolithographic techniques wherein layer 11 is selectively exposed to radiation. Excess material is removed to form the waveguide structures 130. In another method, waveguide structure material is deposited in a groove etched in the cladding material to form the waveguide structure 130. Other techniques such as embossing and micro replication can also be used to form the waveguide structures 130.

Figure 5C:
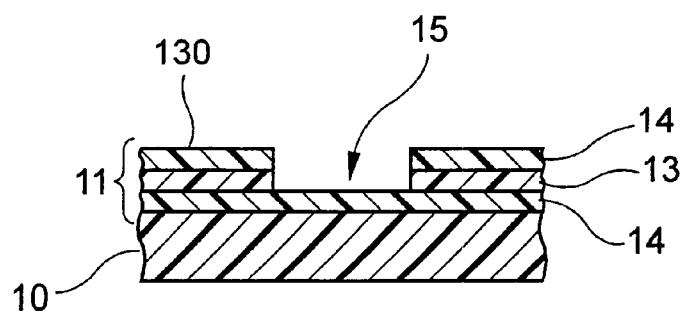

FIG. 5C shows a plurality of trenches 15 being formed in the waveguide structure 130. Photolithographic techniques are used to form trenches 15 on the waveguide structures 130. Excess material is removed by etching.

Figure 5D:
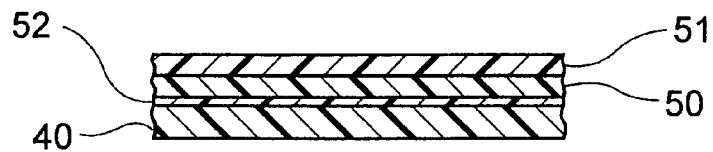
Figure 5E:
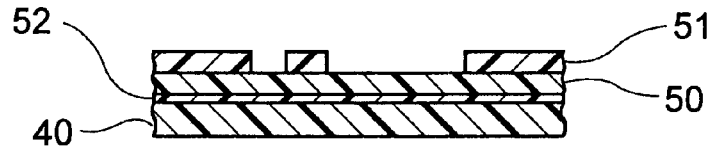
Figure 5F:
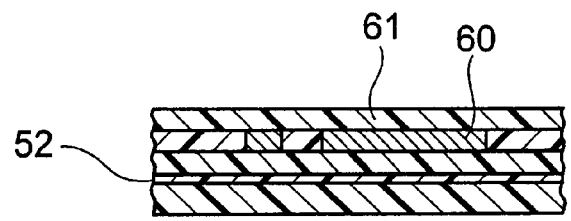
Figure 5G:
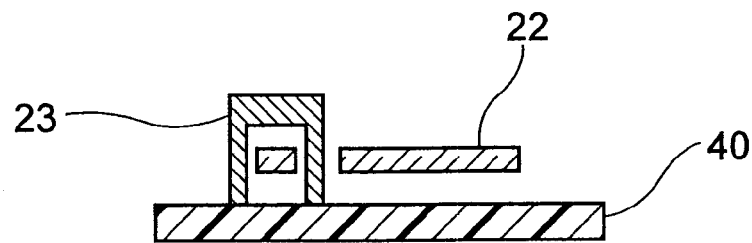

In FIGS. 5D TO 5G, a preferred method of fabricating the switching element 20 is described. In this example, the fabrication of the switch element 20 is carried out using micro-machining on a MEMS substrate. In FIG. 5D, a second substrate 40 is formed. An optional nitride layer 52, an oxide layer 50 and a polysilicon layer 51 are then deposited thereon. The image of the mirror 22 and hinge 28 are transferred onto the polysilicon layer using UV radiation. In FIG. 5E, a mold of the hinge and mirror is formed when excess photoresist material is washed away. In FIG. 5F, the mold is filled with mirror material 60 and covered with an oxide layer 61. As is shown in FIG. 5G, after several intermediate steps wherein holes are drilled and excess material is removed, MEMS mirror 22 and anchor 23 remain on second substrate 40, to form a portion of switching element 20. Mirror 22 is coated with a layer of gold to form the mirrored surface. Subsequently, mirror 22 is rotated to form a right angle with substrate 40. It is noted that the MEMS actuator 25, which is not shown, is also part of switching element 20 and is formed during this process. The actuator 25 is omitted for clarity of illustration.

Figure 5H:
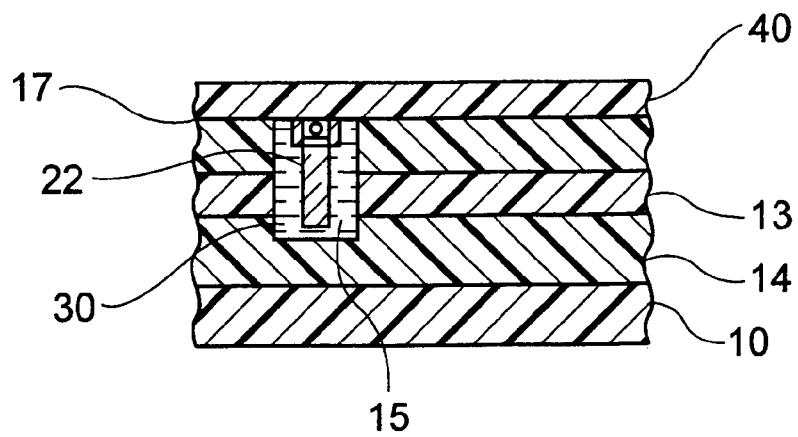

FIG. 5H depicts the final step of fabrication. Second substrate 40 is aligned with the first substrate 10 and mirror 22 is inserted into trench 15. The first substrate 10 is then connected to the second substrate 40 by bonding or some other means. The trenches are filled with fluid 30 using access holes, which are then sealed.

Figure 6:
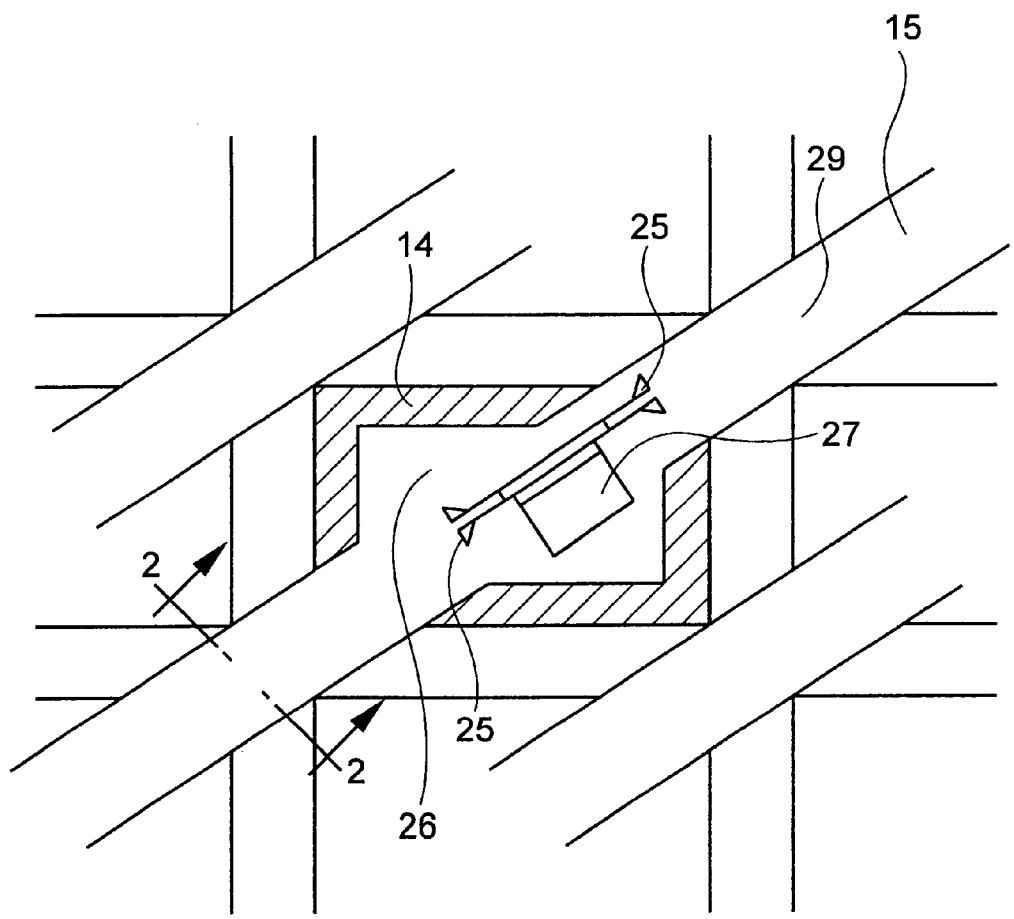
FIG. 6 is a detail view of the second embodiment of the present invention showing the MEMS assembly area.

FIG. 6 is a detail view of a second embodiment of the present invention showing the MEMS assembly area 26. The assembly area 26 is used when the switching element 20 is formed integrally with substrate 10 using the surface micro-machining fabrication technique. The assembly area 26 is formed in that portion of the trench 15 that is situated between waveguide cross-points 29. The purpose of the assembly area is to provide the necessary area for fabricating the mirror 22 and rotating it into its operational position.

Figure 7:
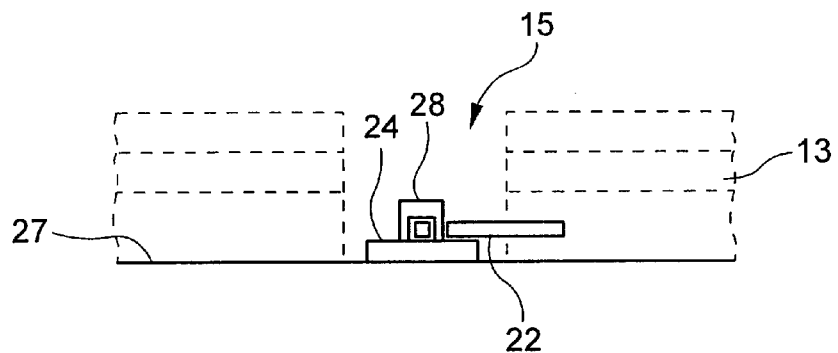
FIG. 7 is a sectional view of the second embodiment of the present invention taken along lines 2—2 of FIG. 6, showing the MEMS assembly area before the MEMS mirror is rotated into position.
Figure 8:
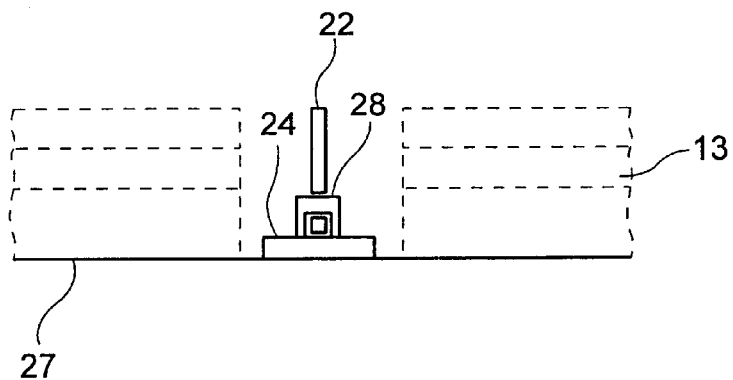
FIG. 8 is a sectional view of the second embodiment of the present invention taken along lines 2—2 of FIG. 6, showing the MEMS assembly area after the MEMS mirror is rotated into position.

FIG. 7 is a sectional view of FIG. 6, taken along lines 2—2 showing the MEMS assembly area before the MEMS mirror is rotated into position. The mirror 22 is shown parallel to the assembly area floor 27 immediately after fabrication. The last step in the fabrication of the switch is to rotate mirror 22 around the hinge 28 into a position perpendicular to assembly floor 27. FIG. 8 is also sectional view of FIG. 6, taken along lines 2—2 showing the MEMS assembly area after the MEMS mirror is rotated into position. After the mirror 22 is rotated, it is then able to slide along slider track 24 inside trench 15 toward the waveguide cross-points 29.

One of ordinary skill in the art will recognize that other methods are used to fabricate the mirrors 22 and the actuators 25. LIGA technology is well suited for this purpose. LIGA uses deep X-ray lithography to expose an X-ray sensitive resist layer. The excess resist is removed and the resulting relief is electroplated. The resulting form is a highly accurate metal structure that can be used as a master for injection molding or compression molding processes, or it can be used as the desired structure itself. Bulk micro-machining by anisotropic etching of (110) silicon is another suitable method of fabrication. This technique has advantages over the surface micro-machining process. When using the bulk micro-machining technique, the mirror 22 does not have to be rotated as depicted in the sequence shown in FIGS. 7–8. The bulk micro-machining technique allows the mirror 22 to be fabricated in a position perpendicular to the substrate 10 as shown in FIG. 8, but without the hinge. The hinge is not needed because the mirror does not have to be rotated into its operational position. This technique would allow for the gold-plating of both sides of the mirror to implement a two-way switch. Another advantage is that the silicon surface is smoother as a result of the bulk micro-machining technique. Silicon-on-insulator technology (SOI) and Single Crystal Reactive Etching and Metallization (SCREAM) process technology can also be used to fabricate mirrors 22 and actuators 25.

Figure 9:
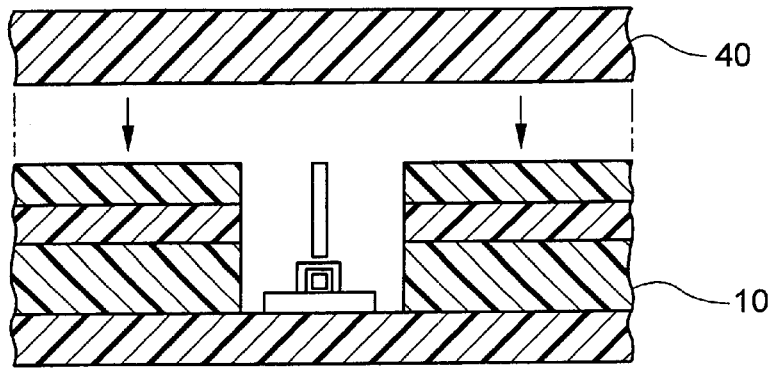
FIG. 9 is a sectional view of the second embodiment of the present invention taken along lines 2—2 of FIG. 6, showing fabrication details.

In an alternate embodiment of the present invention, as embodied herein and depicted in FIG. 9, the second substrate 40 functions only as a cover. The first substrate 10 is then connected to the second substrate 40 by bonding or some other suitable means. The trenches are then filled with fluid 30 using access holes, which are then sealed.

Figure 10:
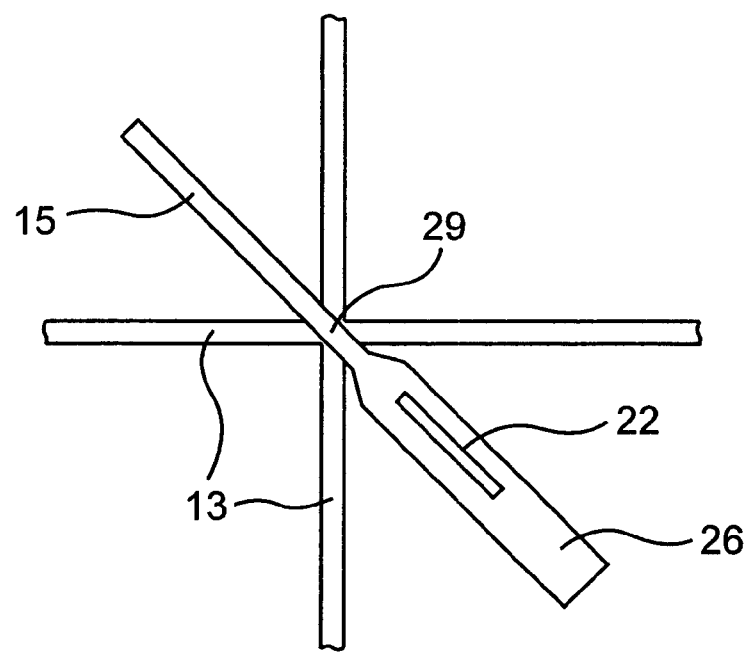
FIG. 10 is a detail view of the MEMS assembly area in accordance with an alternate embodiment of the present invention.

As embodied herein and depicted in FIG. 10, a detail view of the MEMS assembly area 26 in accordance with an alternate embodiment of the present invention is disclosed.

In FIG. 10, MEMS assembly area 26 is fabricated by flaring the side walls of trench 15 out to produce a wider gap. The flaring of the side walls is introduced away from switch cross-point 29 to minimize optical impairment. The wider gap provides more area for the initial assembly of mirror 22.

Figure 11:
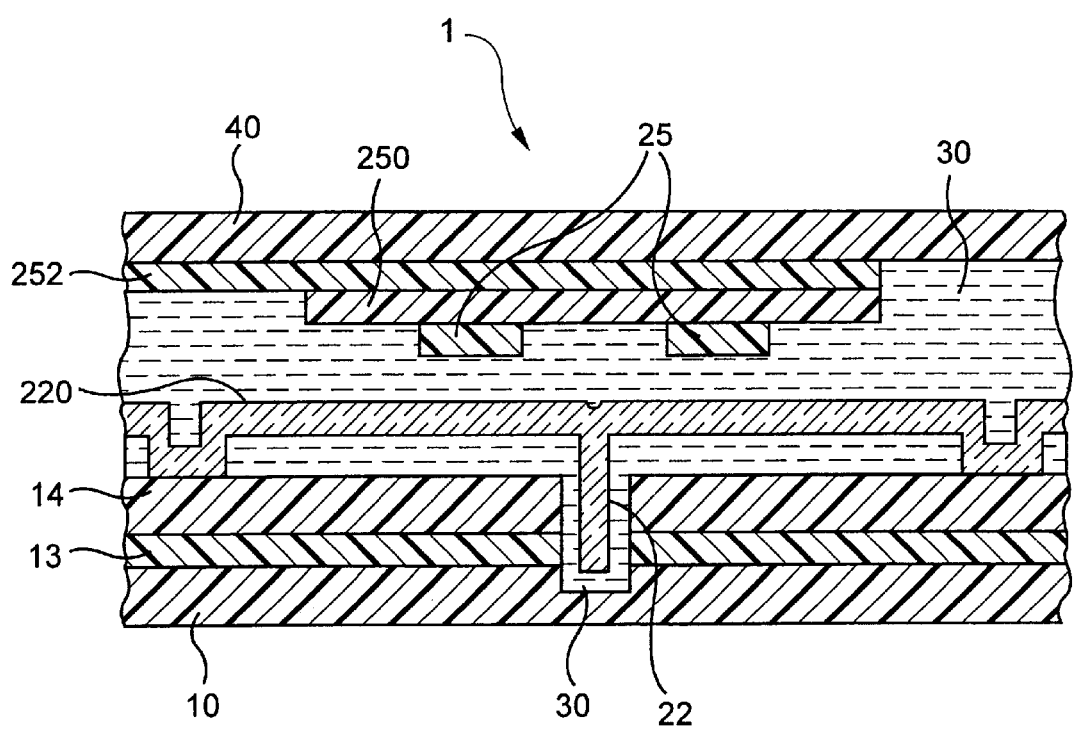
FIG. 11 is a sectional view of a fourth embodiment of the present invention.

As embodied herein and depicted in FIG. 11, a sectional view of a fourth embodiment of the present invention is disclosed. Optical switch 1 includes first substrate 10 and second substrate 40. First substrate 10 has a core portion 13 and cladding 14 deposited thereon to form waveguides 11 and 12. Trench 15 is formed at cross-point 29 where waveguide 11 and waveguide 12 intersect. Collimation-maintaining fluid 30 is disposed in trench 15. Collimation-maintaining fluid 30 has a refractive index substantially the same as the refractive index of core portion 13. Movable mirror 22 has an open position for allowing light to continue to propagate along core 13 and a closed position for directing the light signal into output port 19 (not shown). Mirror 22 is disposed in trench 15 and substantially immersed in collimation-maintaining fluid 30 when in either the open position or the closed position. Mirror 22 includes patterned beam 220 that is used to anchor mirror 22 to cladding 14. Substrate 40 has electrostatic actuator 25 deposited thereon. Actuator 25 is connected to transistor 250. Transistor 250 is connected to individually addressable electrode 252. Thus, a two-dimensional array of transistors 252 is integrated on substrate 40, wherein each cross-point 29 in optical switch 1 has its own addressable electrode 252. The integrated electronics (electrodes 250 and transistors 252) are assembled on substrate 40 using pick and place technology or integrated directly on a silicon wafer deposited on substrate 40. Thus, first substrate 10 is an optical substrate that includes an N×M array of waveguides and second substrate 40 is an electrical substrate that includes the actuation and addressing scheme for the N×M array. One of ordinary skill in the art will recognize that the N×M array forms a non-blocking cross-bar switch.

Switch 1 in FIG. 11 operates as follows. When electrode 252 is de-energized, transistor 250 provides no power to actuator 25 and mirror 22 is in the closed position. Hence, light is reflected by mirror 22 into output port 19 (not shown). When power is applied to electrode 252, transistor 250 is energized and an electrostatic force is present on actuator 25. Plate 220 is flexed upward by the electrostatic force and mirror 22 is lifted out of trench 15 into an open switch position. Light passes through cross-point 29 and continues to propagate along core 13.

Figure 12:
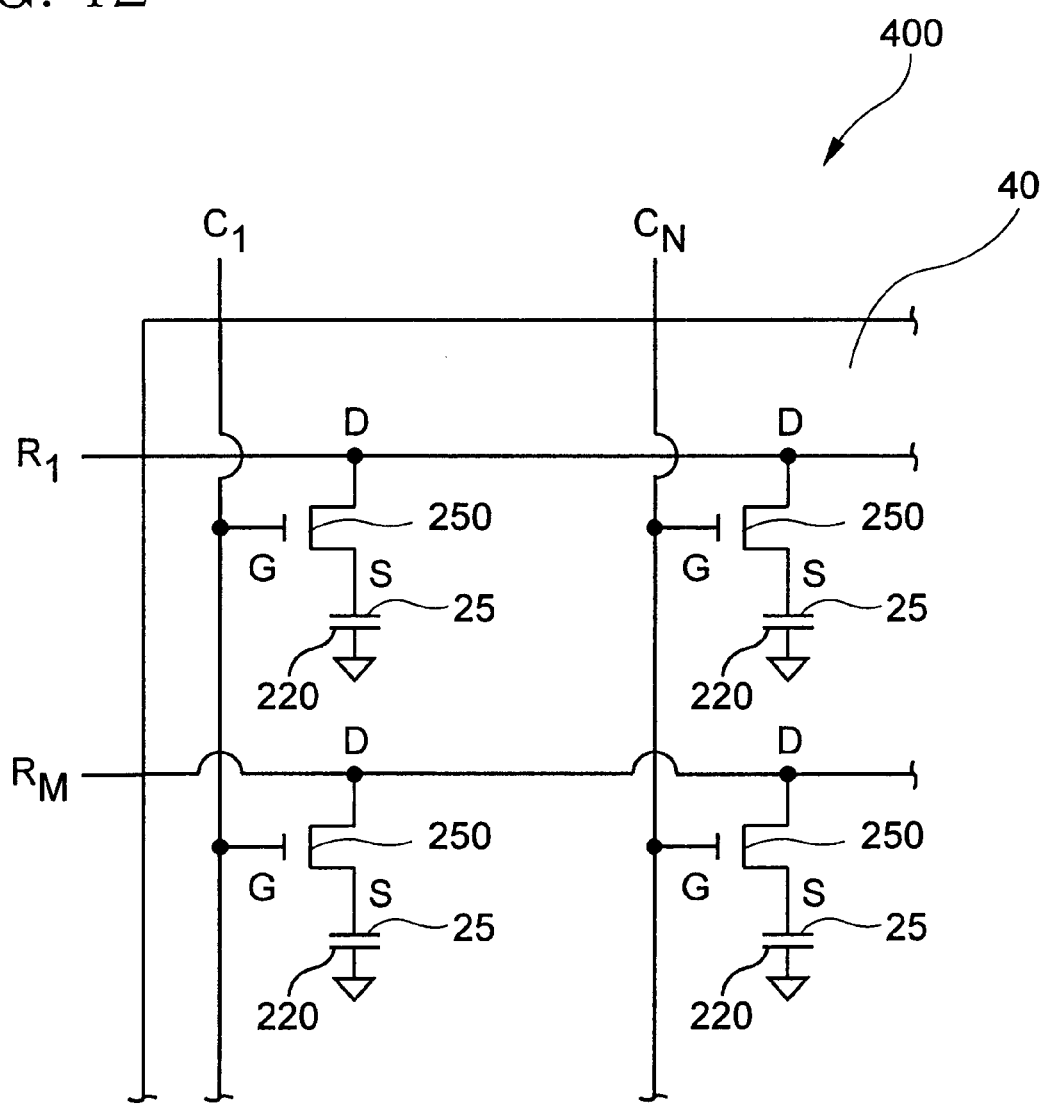
FIG. 12 is a schematic view of the integrated addressing electronics for the fourth embodiment of the present invention.

As embodied herein and depicted in FIG. 12, a schematic view of the integrated addressing electronics 400 for the fourth embodiment of the present invention is disclosed. In an N×M switch, wherein N=M=16 or greater, it is impractical to individually address each transistor 250 with its own electrodes 252. Each gate and drain would need its own electrode. This results in 2×N×M electrodes. In FIG. 12, electrical substrate 40 includes column addressing lines $C1 \ldots C_N$ and row addressing lines $R1 \ldots R_M$. Each column address line Ci is connected to the gate of each transistor 250 in the column Ci. Each row address line Rj is connected to the drain of each transistor in the row Rj. The source of each transistor 250 is connected to the individual electrostatic actuators 25. One of ordinary skill in the art will recognize that actuator 25 and beam 220, as shown in FIGS. 11 and 12, form the upper and lower plates of a capacitor. One of ordinary skill in the art will also recognize that integrated addressing electronics 400 can also be used with magnetic actuators.

Transistor 250 may be of any suitable type, but there is shown by way of example thin film transistors disposed on a glass substrate. One of ordinary skill in the art will recognize that substrate 40 can be implemented as an integrated high voltage CMOS chip that includes transistors 250 and address lines Ci, Rj. Address lines Ci, Rj are connected to a controller (not shown) that drives the electronics and hence, the actuators in accordance with network commands. High voltage CMOS is required because the voltage needed to drive the actuators is within an approximate range between 70V and 125V. One of ordinary skill in the art will recognize that the exact voltage required for a given application is dependent upon the size of the transistor and its leakage current.

Addressing electronics 400 operate as follows. The controller activates one column at a time. After a column C1 is activated with a high voltage, the controller places a control word on the row address lines R1 . . . $R_M$. For example, for system having R1–R4, a control word 1010 would result in R1 and R3 being supplied with a high voltage, and R2 and R4 being grounded. Subsequently, C1 is de-activated and C2 is activated. Again the controller places a control word on the row address lines R1 . . . $R_M$. In like manner, each actuator 25 is actuated one column at a time until switch 1 is in the desired state. One of ordinary skill in the art will recognize that for a non-blocking switch, only one actuator is turned on in any one row or column at a time.

Figure 13:
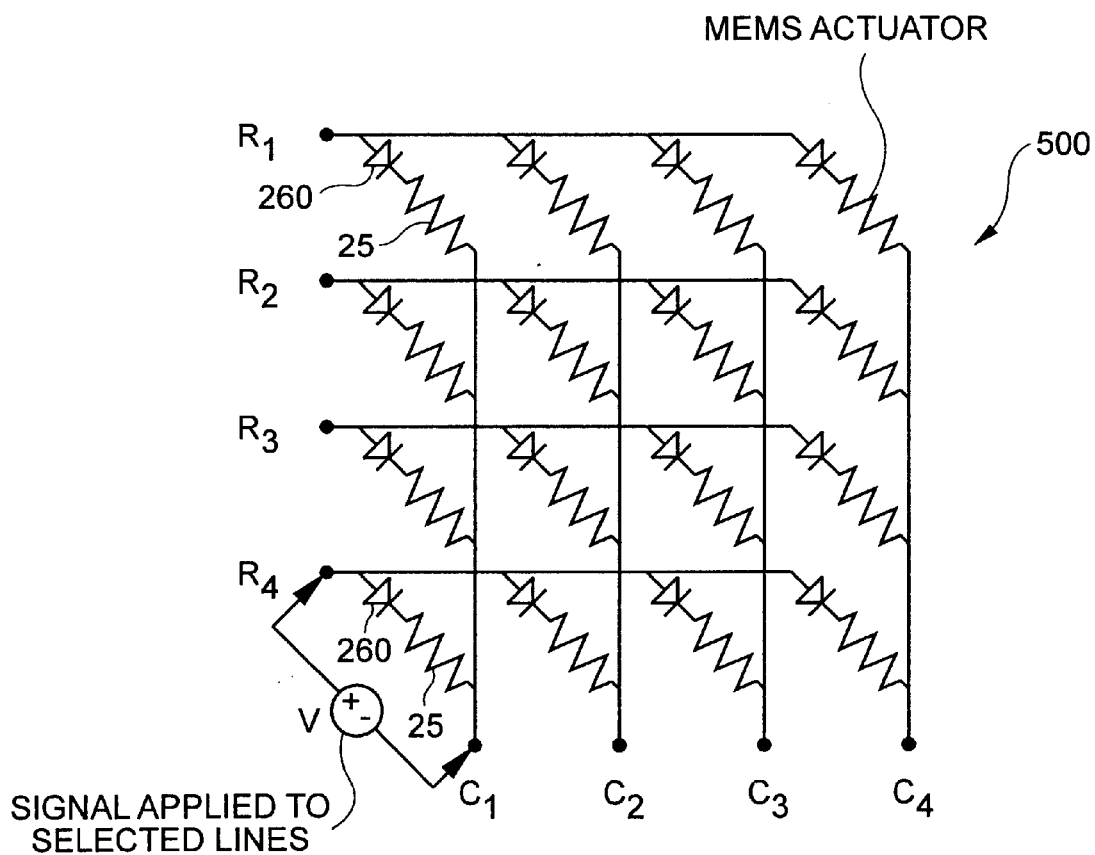
FIG. 13 is a schematic of the addressing electronics for a fifth embodiment using thermal actuators.

As embodied herein and depicted in FIG. 13, a schematic of the addressing electronics 500 for a switch using thermal actuators is disclosed. Thermal actuators are well known in the art. As current flows, the device heats and expands causing the mirror 22 to move along the sliding track 24 (as shown in FIG. 3). In this embodiment, electronics 500 are disposed on the optical substrate 10. Diode 260 is added in series with actuator 25. Diode 260 limits the flow of current to one direction through all of the actuators. Use of diodes 260 eliminates all current paths opposite to the intended row-to-column or column-to-row direction. In this embodiment, note that column C1 is activated by being pulled low, in this case, by V–. Row R4 is addressed using a high voltage V+. Thus, a current flows through diode 260. If C1 were pulled high and R4 were pulled low, diode 260 prevents current from flowing in the reverse direction.

Figure 14:
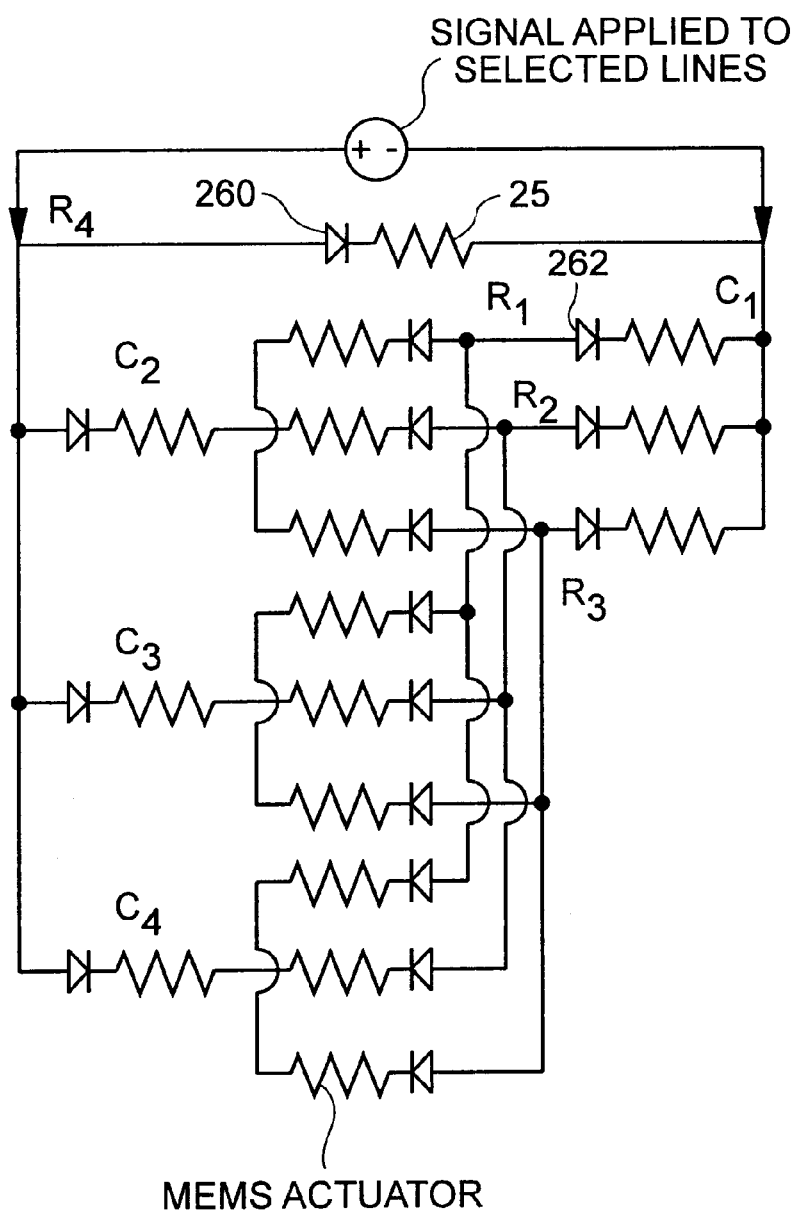
FIG. 14 is an equivalent circuit diagram of the schematic depicted in FIG. 13.

FIG. 14 is an equivalent circuit diagram of the schematic depicted in FIG. 13. As shown, when voltage is applied to row R4 and column C1, all paths going from column terminals C2, C3, or C4, to the row terminals R1, R2, or R3 are blocked by diodes. Since the only remaining current paths are those at the intersection of the activated row and column, all unwanted current paths are eliminated. This is a critical innovation. If diodes 260 are not present, unintended current paths are generated causing unwanted power dissipation in actuators 25 not being addressed. As shown in FIG. 14, there are numerous paths that do not flow through the targeted actuator, for example from row R4, column C1 through row R1, column C2. Diode 262 in FIG. 14, eliminates this unwanted current. The undesirable currents impair performance in two ways. First, they increase the total power required to actuate the device. In a 4×4 array, 56% of the total power is wasted on incidental actuators. This assumes that the resistance value for each actuator is the same. In a 32×32 array, 94% of the power is wasted on incidental actuators. Second, the unwanted currents may partially actuate a mirror resulting in optical insertion loss and cross-talk. Thus, the inclusion of diodes 260 eliminate these problems.

Diodes 260 may be of any suitable type, but there is shown by way of example diodes fabricated by a thin film deposition technique. Diodes 260 can also be fabricated using ion implantation or thermal diffusion. Diodes 260 can also be fabricated on an external substrate much like the fourth embodiment depicted in FIGS. 11 and 12.

While specific embodiments of the invention have been shown and described in detail, it will be understood that the invention may be modified without departing from the spirit of the inventive principles as set forth in the hereinafter claims. Thus, it is intended that the present invention cover the modifications and variations of this invention provided they come within the scope of the appended claims and their equivalents.

What is claimed is:

1. An optical switch for directing a light signal, said optical switch comprising:

a plurality of input optical waveguides;

a plurality of output optical waveguides that intersect said plurality of input optical waveguides at a plurality of cross-points, the plurality of input optical waveguides and the plurality of output optical waveguides being integrally formed on a first substrate;

a plurality of trenches formed at said plurality of cross-points;

a collimation-maintaining fluid disposed in said plurality of trenches;

an array of movable switching elements, each switching element associated with a trench of said plurality of trenches for directing a light signal into an associated one of said output waveguides, said movable switching element being substantially immersed in said collimation-maintaining fluid when in a closed position; and a second substrate connected to said first substrate for encapsulating the collimation-maintaining fluid within the plurality of trenches and for providing actuation of said array of movable switching elements.

2. The optical switch of claim 1, wherein the array of movable switching elements, the plurality of input waveguides, and the plurality of output waveguides form an N×M non-blocking cross-bar switch, wherein N is the number of input waveguides, M is the number of output waveguides and N×M is the number of movable switching elements.

3. The optical switch of claim 1, wherein each of the array of movable switching elements further comprises: a mirror element connected to a plate and extending from said plate into said trench.

4. The optical switch of claim 3, further comprising a two dimensional array of electrostatic actuators disposed on the second substrate, wherein each electrostatic actuator of said array of electrostatic actuators is aligned with a corresponding movable switching element in the array of movable switching elements.

5. The optical switch of claim 4, wherein the plate attached to said moveable switch element is moved by electrostatic attraction when the electrostatic actuator is energized, causing the mirror element to be moved within the trench into an open position.

6. The optical switch of claim 4, wherein the plate is in a quiescent state when the electrostatic actuator is not energized, to thereby cause the moveable switch element to be in the closed position.

* * * * *